(12) United States Patent
Zhou et al.

(10) Patent No.: US 9,955,074 B2
(45) Date of Patent: Apr. 24, 2018

(54) TARGET TRACKING METHOD AND SYSTEM FOR INTELLIGENT TRACKING HIGH SPEED DOME CAMERA

(71) Applicant: HANGZHOU HIKVISION DIGITAL TECHNOLOGY CO., LTD., Hangzhou (CN)

(72) Inventors: Limeng Zhou, Hangzhou (CN); Haixun Guo, Hangzhou (CN); Caihan Shen, Hangzhou (CN); Xiaochen Quan, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 240 days.

(21) Appl. No.: 14/429,007

(22) PCT Filed: Sep. 17, 2013

(86) PCT No.: PCT/CN2013/083604
§ 371 (c)(1),
(2) Date: Mar. 18, 2015

(87) PCT Pub. No.: WO2014/044161
PCT Pub. Date: Mar. 27, 2014

(65) Prior Publication Data
US 2015/0229841 A1 Aug. 13, 2015

(30) Foreign Application Priority Data
Sep. 18, 2012 (CN) .......................... 2012 1 0345711

(51) Int. Cl.
*H04N 7/18* (2006.01)
*H04N 5/232* (2006.01)
(Continued)

(52) U.S. Cl.
CPC ....... *H04N 5/23238* (2013.01); *G01S 3/7864* (2013.01); *G06K 9/00711* (2013.01);
(Continued)

(58) Field of Classification Search
CPC ........ H04N 7/181; H04N 5/247; H04N 5/232; H04N 7/18; H04N 7/185; H04N 5/23238;
(Continued)

(56) References Cited

U.S. PATENT DOCUMENTS 6,707,489 B1 * 3/2004 Maeng ................. G01S 3/7864
348/14.08
6,724,421 B1 * 4/2004 Glatt ................ G08B 13/19608
348/143

(Continued)

FOREIGN PATENT DOCUMENTS

CN 1177747 A 4/1998
CN 1543200 A 11/2004
(Continued)

OTHER PUBLICATIONS

Search Report in International Application No. PCT/CN2013/083604 dated Dec. 26, 2013.
(Continued)

*Primary Examiner* — Dave Czekaj
*Assistant Examiner* — Alison Slater
(74) *Attorney, Agent, or Firm* — Marshall, Gerstein & Borun LLP (57) ABSTRACT

Disclosed is a target tracking method for an intelligent tracking high speed dome, comprising: in the process of target tracking, when the position coordinates of a newly selected target in the acquired tracking image are received, matching the position coordinates of the newly selected target in the tracking image, using the target corresponding to the position coordinates of the newly selected target in the
(Continued)

tracking image as a current target, and extracting the characteristics of the current target; tracking the current target according to the characteristics thereof, and updating in real time the position coordinates of the current target in the tracking image; converting the updated position coordinates of the current target into speed dome identifiable horizontal rotation value P, vertical rotation value T and magnification factor value Z; adjusting in real time the magnification factor of the speed dome, and controlling in real time the rotation of the speed dome.

13 Claims, 5 Drawing Sheets (51) Int. Cl.
*G01S 3/786* (2006.01)
*G06K 9/00* (2006.01)
*G06K 9/62* (2006.01)
*G06T 7/20* (2017.01)
*G06T 7/246* (2017.01)
*G08B 13/196* (2006.01)

(52) U.S. Cl.
CPC ............. *G06K 9/6201* (2013.01); *G06T 7/20* (2013.01); *G06T 7/246* (2017.01); *H04N 7/18* (2013.01); *G08B 13/19608* (2013.01)

(58) Field of Classification Search
CPC ............ H04N 17/002; G08B 13/19608; G08B 13/1963; G08B 13/19628; G06T 2207/30232
See application file for complete search history.

(56) References Cited

U.S. PATENT DOCUMENTS

| | | | |
|---|---|---|---|
| 8,184,144 B2 * | 5/2012 | Chen .................. | G06T 7/80 345/421 |
| 2003/0030742 A1 | 2/2003 | Ike | |
| 2004/0100563 A1 * | 5/2004 | Sablak .................... | H04N 5/77 348/211.4 |
| 2009/0028440 A1 * | 1/2009 | Elangovan ........... | G06K 9/6202 382/216 |
| 2010/0033567 A1 * | 2/2010 | Gupta .................. | H04N 17/002 348/143 |
| 2012/0154599 A1 | 6/2012 | Huang | |
| 2012/0257064 A1 * | 10/2012 | Kim ................ | G08B 13/19626 348/159 |
| 2013/0100272 A1 * | 4/2013 | Price ........................ | G02B 7/38 348/79 |
| 2014/0049640 A1 * | 2/2014 | Shishalov ................ | H04N 7/18 348/143 |
| 2014/0146132 A1 * | 5/2014 | Bagnato ............. | G02B 27/2228 348/36 |

FOREIGN PATENT DOCUMENTS

| | | |
|---|---|---|
| CN | 101873477 A | 10/2010 |
| CN | 102074016 A | 5/2011 |
| CN | 102148965 A | 8/2011 |
| CN | 102646334 A | 8/2012 |
| JP | 2001285850 A | 10/2001 |

OTHER PUBLICATIONS

Decision of Rejection (with concise explanation of relevance in English), Chinese patent application No. 201210345711.3, dated Nov. 1, 2016.

Extended European Search Report, European patent application No. 13839322.8, dated May 12, 2016.

First Office Action (with English translation), Chinese patent application No. 201210345711.3, dated Dec. 23, 2015.

Second Office Action (with English translation), Chinese patent application No. 201210345711.3, dated Jul. 29, 2016.

* cited by examiner

TARGET TRACKING METHOD AND SYSTEM FOR INTELLIGENT TRACKING HIGH SPEED DOME CAMERA

FIELD OF THE INVENTION

The present invention relates to a video monitoring field, and more particularly, to a target tracking method and system for an intelligent tracking fast-speed dome.

BACKGROUND OF THE INVENTION

A fast-speed dome (also called a spherical camera) is referred to as a high speed dome camera, and is an important tracking front in a tracking system. It can be used in a high-density and complicated tracking scenario. The intelligent tracking fast-speed dome includes a positioning system, a communication system and a camera system, and can automatically track a moving object in a scenario. The positioning system refers to a rotating part driven by a motor. The communication system refers to a part of controlling the motor and processing the image signal. The camera system refers to an integrated engine. The systems can perform transverse connections through a main-control CPU and a battery. The battery performs power supply for each system, so all functions can work properly through the main-control CPU.

The fast-speed dome usually adopts a precise differential stepper motor to implement fast and accurate rotating and positioning. These actions can be implemented under the control of the CPU command. The method of writing the images and functions of a camera into the CPU of the fast-speed dome can make the image being transmitted at the same time of controlling the positioning system, as well as the functions of white balance, shutter, aperture, zoom and target tracking.

At present, the speed dome can automatically perform action analysis and alarm tracking. The processes can be automatically implemented through writing a program that is executed by the CPU. When multiple targets occur in an image, with the standard of current intelligent tracking fast-speed dome, the target who triggers an alarm firstly will be tracked.

SUMMARY OF THE INVENTION

A target tracking method for an intelligent tracking fast-speed dome, an intelligent tracking fast-speed dome and a target tracking system for an intelligent tracking fast-speed dome are provided according to embodiments of the present invention which implements the function of switching a tracking target in a process of tracking the target.

A target tracking method for an intelligent tracking fast-speed dome includes:

matching a location coordinate of a newly-selected target in a collected tracking image when receiving the location coordinate of the newly-selected target in the tracking image in a process of tracking a target, setting a target corresponding to the location coordinate of the newly-selected target as a current target, extracting a characteristic of the current target;

tracking the current target according to the characteristic of the current target, updating the location coordinate of the current target in the tracking image in real time;

in real time transforming the updated location coordinate of the current target to a Pan (P) value, a Tilt (T) value and a Zoom (Z) value recognizable for a speed dome; and in real time adjusting a magnification according to the Z value, in real time controlling rotation of the speed dome according to the P value and the T value.

The method further includes:
selecting a monitoring scenario;
calibrating a magnification coefficient of the speed dome.

In the method, a process of calibrating the magnification coefficient of the speed dome includes:

setting the ground level as a monitoring field;
wherein the magnification coefficient of the speed dome is $Z_0 \times \sin(T_0)$ ($Z_0$ is the Z value when a distance between a reference target and the speed dome is a known distance $D_0$, and $T_0$ is the T value when the distance between the reference target and the speed dome is the known distance $D_0$.

The method further includes:

transforming the location coordinate of the newly-selected target to a normalized coordinate, wherein the normalized coordinate is a coordinate value after a normalization processing corresponding to a length and a width of the image is performed.

In the method, a process of in real time transforming the updated location coordinate of the current target to the P value, the T value and the Z value recognizable for a speed dome includes:

transforming the updated location coordinate of the current target to a spherical coordinate taking the speed dome as a center;

obtaining the P value and the T value of the spherical coordinate;

obtaining the Z value according to location information of the current target and the magnification coefficient of the speed dome.

In the method, the P value and the T value are obtained through a method as follows according to the spherical coordinate.

$$P = \arctan(v/u)$$

$$T = \arctan(w/\sqrt{u^2+v^2})$$

wherein the spherical coordinate of the current target is (u, v, w), the spherical coordinate taking the speed dome as the center.

In the method, the Z value is obtained according to location information of the current target and the magnification coefficient of the speed dome through a method as follows:

$$Z = Z_{ref}/\sin(T_1);$$

wherein $\sin(T_1)$ is an adjustment function of the dynamic magnification coefficient of the location information of the current target, $Z_{ref}$ is the magnification coefficient of the speed dome, $T_1$ is information of an angle between the location of the current target and a camera lens of the speed dome.

In the method, a process of controlling the rotation of the speed dome according to the P value and the T value includes:

determining a value and a direction of a speed of the current target through a method as follows:

$$V_{pan} = \frac{\Delta P}{\Delta t} = \frac{P_{new} - P_{cur}}{\Delta t}$$

$$V_{tilt} = \frac{\Delta T}{\Delta t} = \frac{T_{new} - T_{cur}}{\Delta t}$$

wherein $V_{pan}$ is a moving speed along a horizontal rotation direction in a spherical coordinate system taking the speed dome as the center, $V_{tilt}$ is a moving speed along a vertical rotation direction in the spherical coordinate system taking the speed dome as the center;

$P_{new}$ and $T_{new}$ are respectively a new P value and a new T value in the spherical coordinate system taking the speed dome as the center, $P_{cur}$, $T_{cur}$ is a current P value and a current T value of the speed dome, $\Delta t$ is the time of processing a frame.

controlling the speed dome to be accelerated or decelerated according to the value and the direction of the speed of the current target.

In the method, a process of controlling the speed dome to be accelerated or decelerated according to the value and the direction of the speed of the current target includes:

step a, determining whether a moving direction of the current tracking target is same as a current rotation direction of the speed dome; when the moving direction of the current tracking target is same as the current rotation direction of the speed dome, performing step b, otherwise, performing step f;

step b, determining whether the moving speed of the current tracking target is more than a current rotation speed of the speed dome, when the moving speed of the current tracking target is more than the current rotation speed of the speed dome, performing step c, otherwise, performing step d;

step c, accelerating the current rotation speed of the speed dome, and performing step d;

step d, determining whether the moving speed of the current tracking target is equal to the current rotation speed of the speed dome, when the moving speed of the current tracking target is equal to the current rotation speed of the speed dome, performing step i, otherwise, performing step e;

step e, decelerating the current rotation speed of the speed dome, and performing step d;

step f, decelerating the current moving speed of the speed dome, and performing step g;

step g, determining whether the current rotation speed is equal to zero, when the current rotation speed is equal to zero, performing step h, otherwise performing step f;

step h, changing the rotation direction of the speed dome, and performing step b;

step i, tracking the current target with the current rotation speed.

An intelligent tracking fast-speed dome includes an image collecting module, a central processor, a driven circuit and an adjustment module, the central processor is to match a location coordinate of a newly-selected target in a tracking image collected by the image collecting module when receiving the location coordinate of the newly-selected target in the tracking image in a process of tracking a target, set a target corresponding to the location coordinate of the newly-selected target as a current target, extract a characteristic of the current target, track the current target according to the characteristic of the current target, in real time update the location coordinate of the current target in the tracking image, in real time transform the updated location coordinate of the current target to a Pan (P) value, a Tilt (T) value and a Zoom (Z) value recognizable for a speed dome, output to the adjustment module the P value, the T value and the Z value via the driven circuit; and the adjustment module is to in real time adjust a magnification according to the Z value, in real time control rotation of the speed dome according to the P value and the T value.

A system for an intelligent tracking fast-speed dome includes an intelligent tracking fast-speed dome and a host computer, the host computer is to transmit a location coordinate of a newly-selected target in a tracking image to the intelligent tracking fast-speed dome in a process of tracking a target;

the intelligent tracking fast-speed dome comprises an image collecting module, a central processor, a driven circuit and an adjustment module, wherein the central processor is to match a location coordinate of a newly-selected target in a tracking image collected by the image collecting module when receiving the location coordinate of the newly-selected target in the tracking image in a process of tracking a target, set a target corresponding to the location coordinate of the newly-selected target as a current target, extract a characteristic of the current target, track the current target according to the characteristic of the current target, in real time update the location coordinate of the current target in the tracking image, in real time transform the updated location coordinate of the current target to a Pan (P) value, a Tilt (T) value and a Zoom (Z) value recognizable for a speed dome, output to the adjustment module the P value, the T value and the Z value via the driven circuit; and the adjustment module is to in real time adjust a magnification according to the Z value, in real time control rotation of the speed dome according to the P value and the T value.

It can be seen from the above that, according to the target tracking method for an intelligent tracking fast-speed dome, the intelligent tracking fast-speed dome and the target tracking system for an intelligent tracking fast-speed dome are provided according to embodiments of the present invention, when multiple targets occur in a scenario, a monitoring person can select a target concerned by the monitoring person to perform a selective tracking process and to solve a problem in the scenario that the multiple targets occur, the tracking target is not the concerned target, the concerned target is missed, and a monitoring purpose cannot be achieved. At the same time, in a tracking process of the speed dome, since the scenario is complicated and an image analysis technology is limited, a condition may occur that the target is missed or is blocked by another target. According to the method of the present invention, the target can be re-selected. In addition, in a scenario that a large target is tracked, e.g., a large truck, in a conventional method, a target for image analysis may be on a top of the truck or another part, and may not be in a concerned license plate location, which may cause that in the tracking process, the license plate cannot be seen. According to the method, the speed dome and the system for the speed dome of the present invention, the license plate part can be selected to be tracked.

DETAILED DESCRIPTION OF THE INVENTION

In order to make the object, technical solution and merits of the present invention clearer, the present invention will be illustrated in detail hereinafter with reference to the accompanying drawings and specific examples.

Figure 1:
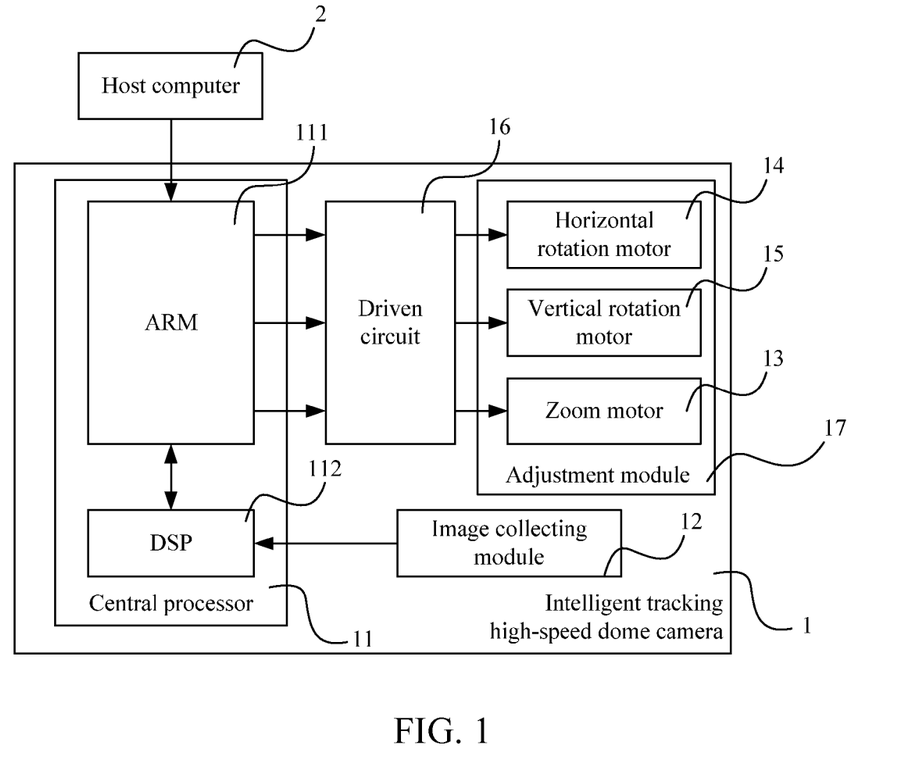
FIG. 1 is a schematic diagram illustrating a structure of a system for implementing a target tracking method and system for an intelligent tracking fast-speed dome according to an embodiment of the present invention.

The present invention applies to a system for an intelligent tracking fast-speed dome as shown in FIG. 1. The system includes an intelligent tracking fast-speed dome 1 and a host computer 2. The host computer 2 (e.g., a computer used to perform monitoring) is mainly used to select a target, and transmit a location coordinate of the selected target to the intelligent tracking fast-speed dome 1. The host computer 2 may select the target to be tracked in a tracking image in a monitoring process. The intelligent tracking fast-speed dome 1 is to set the target selected by the host computer 2 as a tracking target. In the tracking process, when the host computer 2 selects a new target, the tracking target is changed, i.e., the newly-selected target is tracked. The intelligent tracking fast-speed dome 1 include a central processing 11, an image collecting module 12, a zoom motor 13, a horizontal rotation motor 14 and a vertical rotation motor 15. The image collecting module 12 and the zoom motor 13 locates in a camera system of the speed dome, i.e., the integrated engine. The image collecting module 12 is to collect an image. The zoom motor 13 is to perform zoom for the collected image. The horizontal rotation motor 14 and the vertical rotation motor 15 locate in a pan-and-tilt system, and are to adjust a shooting angle of the camera system in the speed dome. The intelligent tracking fast-speed dome 1 may further include a driven circuit 16 to drive the zoom motor 13, the horizontal rotation motor 14 and the vertical rotation motor 15. The central processor 11 is mainly to process and output the image collected by the camera system (through the image collecting module 12), and control the zoom motor 13, the horizontal rotation motor 14 and the vertical rotation motor 15 according to the collected tracking image, so that the speed dome can track the target shot by the speed dome. In an example, the central processor 11 includes an Advanced RISC Machines (ARM) processor 111 and a digital signal processor (DSP) 112. In an example, the ARM processor 111 is to receive a location coordinate of the selected target from the host computer 2, and perform a normalization processing. In particular, according to the location coordinate of the current tracking target in the tracking image collected by the image collecting module provided by the DSP 112, a P value, a Tilt (T) value and a Z value are generated. The ARM processor 111 controls the horizontal rotation motor 14 and the vertical rotation motor 15 and the zoom motor 13, so that according to movement of the current tracking target, the speed dome adjust a shooting direction in order to track and shoot the current tracking target. The DSP 112 is to compare a normalized coordinate of the selected target with the tracking image collected by the collecting module 12 in order to determine the current tracking target that is same with the selected target, and is further to in real time transmit the location coordinate of the current tracking target in the tracking image collected by the image collecting module to the ARM processing 111. The P value, the T value and the Z value are signals that can be recognized by the speed dome. The P value is a horizontal rotation value of the speed dome. The T value is a vertical rotation value of the speed dome. The Z value is an magnification of the speed dome. In the present invention, the speed dome can also be called as a PTZ (Pan-Tilt-Zoom) camera in the art. A structure and function modules of the speed dome can refer as to the prior art, which is not described repeatedly herein.

Figure 2:
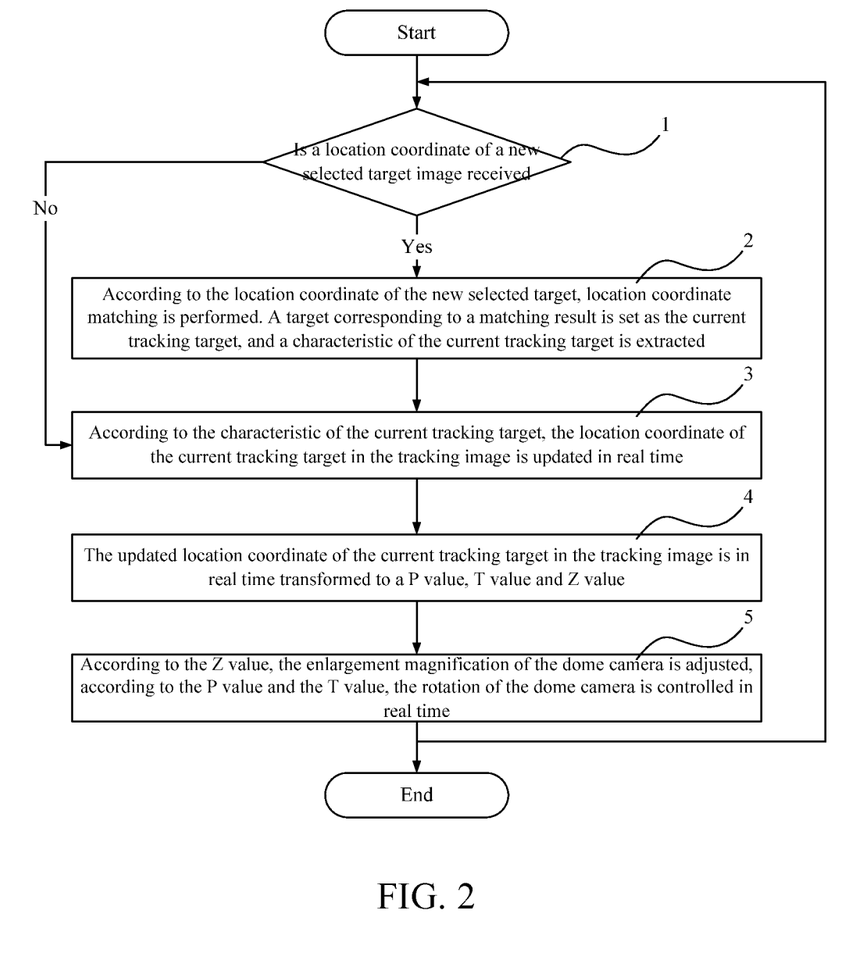
FIG. 2 is a flowchart illustrating a target tracking method and system for an intelligent tracking fast-speed dome according to an embodiment of the present invention.

A target tracking method for an intelligent tracking fast-speed dome according to the present invention includes: setting a target selected by a host computer as a tracking target to perform tracking; changing the tracking target to perform the tracking according to the new target selected by the host computer. In particular, as shown in FIG. 2, the process of tracking the current tracking target includes procedures as follows.

At block 1, it is determined that whether a location coordinate of a new selected target in a collected tracking image is received. If the location coordinate is received, a procedure at block 2 is performed. Otherwise, a procedure at block 3 is performed.

At block 2, according to the location coordinate of the new selected target in the collected tracking image, location coordinate matching is performed for the location coordinate of the new selected target in the tracking image collected by the image collecting module. A target in the tracking image corresponding to the location coordinate of the newly-selected target in the tracking image is set as the current tracking target, and a characteristic of the current tracking target is extracted, and a procedure at block 3 is performed.

At block 3, according to the characteristic of the current tracking target, the current target is tracked, the location coordinate of the current tracking target in the tracking image collected by the image collecting module is updated in real time, and a procedure at block 4 is performed.

At block 4, the consecutively-updated location coordinate of the current tracking target in the tracking image collected by the image collecting module is in real time transformed to a P (horizontal rotation) value, T (vertical rotation) value, and Z (magnification) value, and a procedure at block 5 is performed.

At block 5, according to the Z value, the magnification of the speed dome is adjusted in real time, according to the P value and the T value, the rotation of the speed dome is controlled in real time, and a procedure at block 1.

Further, before the intelligent tracking fast-speed dome tracks the target, a monitoring scenario and speed dome related parameters may be configured, which includes procedures as follows.

In step I, the monitoring scenario is selected.

In step II, a magnification coefficient of the speed dome is calibrated.

In addition, at block 2, in a process of matching the location coordinate in the collected tracking image, a normalization operation may be included, i.e., the location coordinate of the selected target is transformed to the normalized coordinate of the selected target.

A target tracking method for an intelligent tracking fast-speed dome is illustrated accompanying with FIG. 1 and FIG. 2.

In step I, the monitoring scenario is selected.

The central processor 11 may perform a process of monitoring a suspicious target in a designated monitoring scenario, i.e., in an area in which the intelligent tracking fast-speed dome performs monitoring, e.g., a monitoring area such as a bank, a station. When the monitoring scenario is selected, a focal distance may be adjusted for the intelligent tracking fast-speed dome, so that the intelligent tracking fast-speed dome can monitor the suspicious target in a large area.

In step II, a magnification coefficient of the speed dome is calibrated.

In a tracking stage, since the tracking target moves, a distance between the tracking target and the intelligent tracking fast-speed dome may be changed. Thus, the central processor 11 in the intelligent tracking fast-speed dome may control the magnification. When the tracking target is far away the speed dome, the magnification of the intelligent tracking fast-speed dome is increased. When the tracking target is close to the speed dome, the magnification of the intelligent tracking fast-speed dome is decreased. Thus, it is ensured that the tracking target can always locate in a scenario area shot by the intelligent tracking fast-speed dome. In step II, the magnification coefficient of the speed dome is calibrated according to a method as follows.

Figure 3:
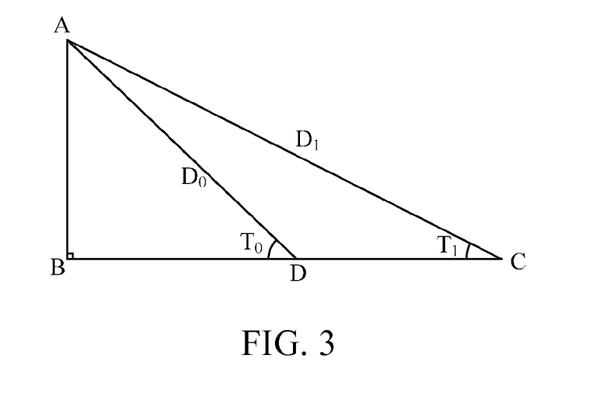
FIG. 3 is a schematic diagram illustrating a module of setting a magnification coefficient of a speed dome according to an embodiment of the present invention.

It is assumed that the visual range of the intelligent tracking fast-speed dome is a ground level. A simple module in FIG. 3 is used. Line segments BC and BD represent the ground level. A dot A represents an installation location of the intelligent tracking fast-speed dome. A line segment AB is vertical with the line segment BC. A length of the AB is a height H of the intelligent tracking fast-speed dome from a ground. Dots C and D respectively represent two locations of a reference target when the magnification coefficient of the speed dome is calibrated. A length of the AC $D_1$ is a distance between the reference target and the intelligent tracking fast-speed dome when the reference target locates in a dot C. It is assumed that $D_1$ is a distance to be obtained. ∠ACB is an angle between the line segment AC from the reference target and the intelligent tracking fast-speed dome and the ground level when the reference target locates at the dot C. A ∠ACB value is $T_1$. A length of the AD $D_0$ is a distance between the reference target and the intelligent tracking fast-speed dome when the reference target locates in a dot D. It is assumed that $D_0$ is a known distance. ∠ADB is an angle between the line segment AD from the reference target and the intelligent tracking fast-speed dome and the ground level when the reference target locates at the dot D. A ∠ADB value is $T_0$. According to a geometric relation, a known parameter of the speed dome and a control way, $T_1$ and $T_0$ are the T value of the intelligent tracking fast-speed dome, i.e., the Tilt value of the intelligent tracking fast-speed dome. Accordingly, when the reference target locates at the doc C (i.e., it corresponds to the distance $D_1$ to be obtained), the magnification Z value of the intelligent tracking fast-speed dome is a magnification $Z_1$ to be obtained. When the reference target locates at the dot D (i.e., it corresponds to the known distance $D_0$), the magnification Z value of the intelligent tracking fast-speed dome is a known magnification $Z_0$. According to geometry knowledge, when the reference target respectively locates at the dot C and dot D, a relation between the magnification $Z_1$ to be obtained and the known magnification $Z_0$ is:

$$\frac{Z_1}{Z_0} = \frac{D_1}{D_0} = \frac{\frac{H}{\sin(T_1)}}{\frac{H}{\sin(T_0)}} = \frac{\sin(T_0)}{\sin(T_1)} \quad (1')$$

It is obtained that $$Z_1 = \frac{Z_0 \times \sin(T_0)}{\sin(T_1)} \quad (1)$$

It can be seen from the formula (1) that when $Z_0$, $T_0$ and $T_1$ are known, $Z_1$ may be dynamically calculated.

The magnification coefficient of the speed dome is $Z_0 \times \sin(T_0)$. The process of calibrating the magnification coefficient of the speed dome includes determining the $Z_0$ and $T_0$. A suitable size of the reference target can locate in a viewing center by adjusting the location of the intelligent tracking fast-speed dome (mainly the T value of the speed dome) and the focal distance to a suitable magnification (the Z value). The T value and the Z value obtained from the intelligent tracking fast-speed dome are respectively taken as $T_0$ and $Z_0$. A value of $Z_0 \times \sin(T_0)$ is calculated. A process of calibrating the magnification coefficient of the speed dome finishes. As shown in FIG. 3, when the reference target locates at the dot D, the T value and the Z value of the intelligent tracking fast-speed dome are adjusted so that the reference target with a suitable size locates in the viewing center. At this time, the T value and the Z value of the intelligent tracking fast-speed dome are respectively taken as $T_0$ and $Z_0$. $Z_0 \times \sin(T_0)$ is calculated, which is the magnification coefficient of the speed dome. Afterwards, in a process of tracking the target, when the T value (i.e., the vertical rotation value of the intelligent tracking fast-speed dome, or a shooting elevation angle (a depression angle) of the intelligent tracking fast-speed dome, or a rotation angle of the intelligent tracking fast-speed dome along a direction vertical with the ground level) is changed, the T value and the Z value may be dynamically obtained through the formula (1) in order to dynamically adjust the Z value.

At block 1, it is determined that whether a location coordinate of a newly-selected target in a collected tracking image is received. If the location coordinate is received, a procedure at block 2 is performed. Otherwise, a procedure at block 3 is performed.

In the monitoring process, the host computer 2 is to select a concerned target in a monitored scenario image, focus the target after the target is selected, and transmit a location coordinate (x, y) of the target in the monitored scenario image to the intelligent tracking fast-speed dome 1. In the intelligent tracking fast-speed dome 1, the central processor 11 is to receive the location coordinate (x, y) of the target from the host computer 2. In an example, the ARM processor 111 in the central processor 11 is to receive the location coordinate (x, y) of the selected target from the host computer 2.

The location coordinate of the newly-selected target is transformed to a normalized coordinate. Since different cameras may have different resolution ratios and a same camera may supports multiple resolution ratios, coordinate values of the selected target in a same location may be different in different resolution ratios. In order to solve the problem, a normalization processing may be used. In different resolution ratios, after the normalization processing is performed for a target coordinate, target locations may be same when the image is analyzed.

At block 2, According to the location coordinate of the newly-selected target in the collected tracking image, location coordinate matching is performed for the location coordinate of the newly-selected target in the tracking image collected by the image collecting module. A target that is in the tracking image and corresponds to the location coordinate of the newly-selected target in the tracking image is set as the current tracking target, and a characteristic of the current tracking target is extracted.

At this block, in a process of matching the location coordinate in the collected tracking image, a normalization operation may further included, i.e., transforming the location coordinate of the selected target to the normalization coordinate. Procedures as follows are included at this block.

Figure 4:
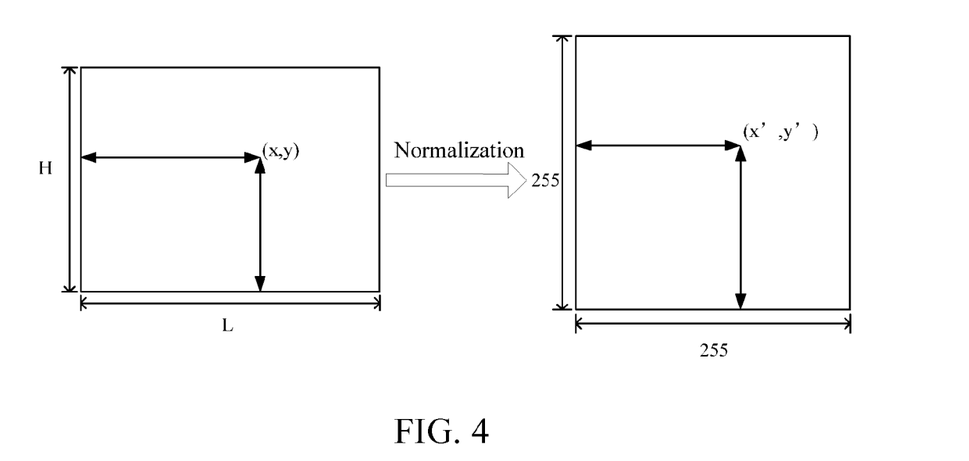
FIG. 4 is a schematic diagram illustrating a normalization processing for a selected target according to an embodiment of the present invention.

The normalization processing may be implemented through the central processor 11, e.g., the ARM processor 111. The ARM processor 111 transforms the received location coordinate (x, y) of the target to the normalization coordinate (x', y'), and transmits the normalization coordinate (x', y') of the selected target to the DSP 112 to perform a subsequent processing. As shown in FIG. 4, the normalization coordinate (x', y') of the selected target is a coordinate value obtained after the normalization processing is performed according to a length L and a width H of the image. It is assumed that the length of the image area is L, the width of the image area is H, and an actual coordinate of the selected target in the image is (x, y). After the normalization process is performed, the obtained normalization coordinate of the selected target (x', y') relative to a 255x255 plane as shown in FIG. 4 is:

$$x' = 255 \times \frac{x}{L} \quad (2)$$

$$y' = 255 \times \frac{y}{L} \quad (3)$$

For example, the DSP 112 receives the location coordinate of the newly-selected target from the ARM processor 111, and performs positioning in the tracking image collected by the image collection module 12 according to the location coordinate of the newly-selected target, so that the current tracking target is determined in the tracking image collected by the image collection module 12, which is same as the selected target, i.e., the target corresponding to the location coordinate of the newly-selected target in the tracking image collected by the image collected module 12 may be determined as the current tracking target. Afterwards, the DSP 112 extracts the characteristic of the current tracking target, and may further determine whether the current tracking target is same as the newly-selected target.

At block 3, according to the characteristic of the current tracking target, the current target is tracked, the location coordinate of the current tracking target in the tracking image collected by the image collecting module is updated in real time.

At this block, according to the characteristic of the current tracking target, the central processor 11 in real time updates the location coordinate of the current tracking target in the tracking image collected by the image collection module 12. For example, according to the characteristic of the current tracking target, the DSP 112 in real time updates the location coordinate of the current tracking target in the tracking image collected by the image collection module 12. For example, the DSP 112 in real time updates the location coordinate of the target in the image in a frame ratio 25 frames/s, and transmits the updated location coordinate to the ARM processor 111.

At block 4, the location coordinate of the consecutively-updated current tracking target in the tracking image collected by the image collecting module is transformed in real time to a P (horizontal rotation) value, T (vertical rotation) value, and Z (magnification) value.

Figure 5:
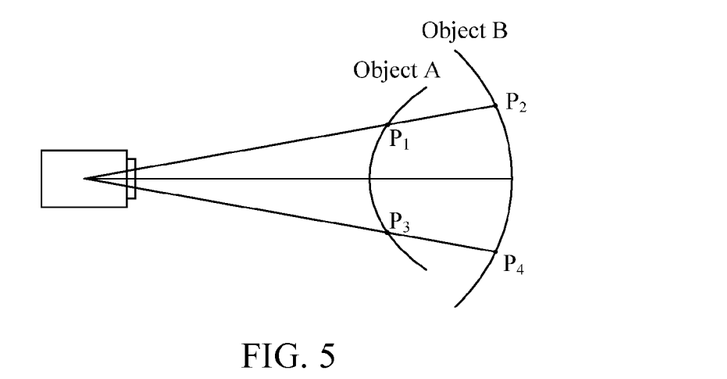
FIG. 5 is a schematic diagram illustrating viewing angles corresponding to the points of different three-dimensional sharps displayed in a same location in an image with a same zoom according to an embodiment of the present invention.

For tracking image information collected by the image collection module, there is a relation that as shown in FIG. 5, viewing angles corresponding to a dot displayed in a same location of the image in a same zoom are basically same no matter which three-dimensional sharps scenes in the image are.

In FIG. 5, an object A and an object B have different three-dimensional sharps. Locations of a dot P1 and a dot P2 can be considered as a same location in the shot image, and correspond to certain viewing angles, which are similar as these of a dot P3 and a dot P4. Thus, there is a relation between a dot in the image and a certain viewing angle of a camera lens (or the image collection module).

Figure 6:
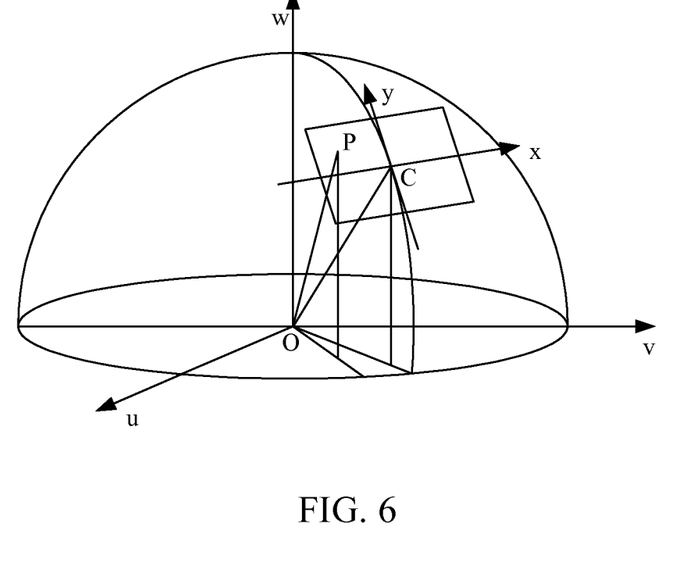
FIG. 6 is a schematic diagram illustrating a module used for transforming an image coordinate of a target to a P value, a T value and a Z value according to an embodiment of the present invention.
Figure 7:
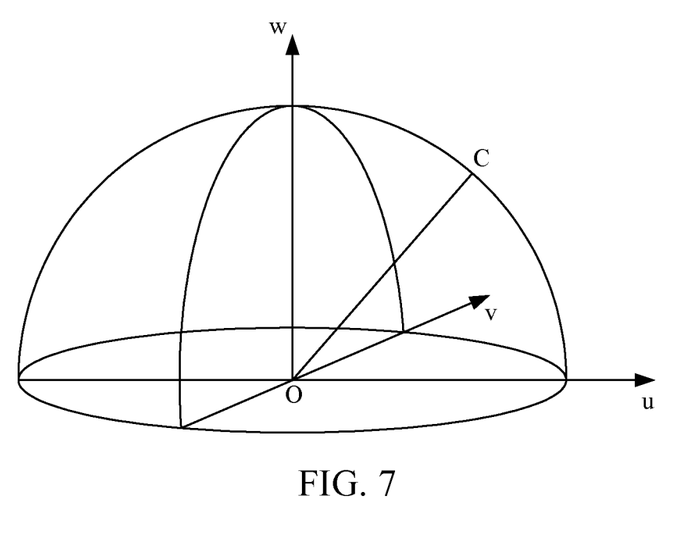
FIG. 7 is a schematic diagram illustrating a module for transforming a location coordinate of a current tracking target in an image to a spherical coordinate which is taking a speed dome as a center according to an embodiment of the present invention.

The relation may be transformed to detail pan-and-tilt rotation. A geometric model as shown in FIG. 6 may be considered. The camera lens locates in a center dot O of a half-sphere, OC is an optical axis of the camera lens. According to the relation above, a middle plane represents an object. The plane may be a tangent plane where the dot C locates, and may be equivalent as a plane on which a mouse clicks in the tracking image. The tracking image collected by the image collection module is represented with a rectangle area. Thus, according to different azimuthal angles where the integrated engine locates, locations of the rectangle area in a space may be different accordingly. When the mouse clicks at the dot P in the rectangle area, latitude and longitude of the line segment OP corresponding to half-sphere may be calculated according to solid geometry. A direction angle of the optical axis is adjusted to the direction through pan-and-tilt rotation, the dot P naturally locates in a center of the video image. A calculation method in the present invention is illustration as follows.

The horizontal direction and the vertical direction of the image are respectively divided into 255 equal parts (i.e., divided into the 255 equal parts along a x direction and a y direction in a xy plane as shown in FIG. 6), the dot C locates in the center of the image, the coordinate of the dot C is (centerX, centerY). Thus, the coordinate of the dot P is:

$$x=(centerX-255/2)/ratio$$

$$y=(centerY-255/2)$$

wherein ratio=tan(a)/tan(b)

a is a vertical viewing half-angle in a minimum magnification (doubled) of the engine, b is a horizontal viewing half-angle in a minimum magnification (doubled) of the engine.

The spherical radius is:

$$R=OC=255/2/\tan \alpha$$

wherein α is a vertical viewing half-angle in a certain magnification;

or the spherical radius is approximated by $$R=OC=(255/2/\tan \beta) \times zoom$$

wherein β a vertical viewing half-angle in a minimum magnification (doubled) of the camera engine, zoom is a current magnification.

In order to make calculation simple, a condition that the OC is in the VOW plane may be considered. In this condition, the coordinate of the P (u, v, w) is as follows.

$$u=U;$$

$$v=R \times \cos \text{Tilt} - v \times \sin \text{Tilt};$$

$$w=R \times \sin \text{Tilt} + v \times \cos \text{Tilt};$$

wherein cos Tilt and sin Tilt are respectively a cosine function and a sine function of an angle between the OC and v axis.

Thus, the relative offset angle of longitude of the OP axis is:

$$P=\arctan(u/v)$$

An absolute latitude angle is:

$$T=\arctan(w/\sqrt{u^2+v^2})$$

According to the calculation above, the spherical coordinate (u, v, w) is obtained according to the coordinate of (x, y) in the shot tracking image, and the P value and the T value is obtained accordingly.

Since the location coordinate of the current tracking target in the tracking image collected by the image collection module 12 is updated in real time, the DSP 112 continuously transmits the updated coordinate to the ARM processor 111 in real time. Thus, the intelligent tracking fast-speed dome 1 can adjust a shooting direction in real time according to the changed location of the tracking target so as to ensure that the target is tracked.

When the current tracking target is tracked in real time, a change of the current tracking target in the tracking image collected in the image collection module 12 is transformed to the P value, the T value and the Z value recognized by the intelligent tracking fast-speed dome 1 in order to automatically control the shooting direction and the magnification of the intelligent tracking fast-speed dome 1. The location coordinate of the current tracking target in the tracking image collected by the image collection module is transformed to the P value, the T value and the Z value that can be recognized by the intelligent tracking fast-speed dome 1. The transforming process includes procedures as follows.

In step 41, the location coordinate of the current tracking target in the tracking image collected by the image collection module is transformed to a spherical coordinate taking the speed dome as a center.

In step 42, The P value and the T value are obtained according to the spherical coordinate.

In step 43, according to the location information of the current tracking target in the tracking image collected by the image collection module and the magnification coefficient of the speed dome, the Z value is obtained.

In particular, steps III to IV are implemented according to a method as follows.

In the geometric model as shown in FIG. 5, the intelligent tracking fast-speed dome 1 locates in a center dot O of the half-sphere. A horizontal direction of a spherical coordinate system of the half-sphere taking the intelligent tracking fast-speed dome 1 as the center includes a u direction and a v direction that are vertical with the u direction. The vertical direction of the spherical coordinate system includes a w direction that is vertical with the u direction and the v direction. The OC is the optical axis of the camera lens of the intelligent tracking fast-speed dome 1. A tangent plane where the doc C on a spherical surface of the half-sphere locates in the FIG. 5 is an image plane in FIG. 4, i.e., the tracking image plane collected by the image collecting module 12. The image plane may move along with changing the direction angle of the intelligent tracking fast-speed dome 1, but is static relative to the optical axis of the camera lens of the intelligent tracking fast-speed dome 1. In FIG. 5, the coordinate (u, v, w) is equivalent to a three-dimensional coordinate (x, y, z). In order to distinguish the three-dimensional coordinate (x, y, z) with the location coordinate of the newly-selected target (x, y) and the normalization coordination (x', y'), the three-dimensional coordination is represented with (u, v, w). According to a conversion relation between the three-dimensional coordinate (u, v, w) and the spherical coordinate (r, θ, φ), it may be obtained:

$$\phi=\arctan(v/u)$$

$$\theta=\arctan(w/\sqrt{u^2+v^2})$$

Wherein φ is a rotation angle from the dot O of the half-sphere (i.e., the intelligent tracking fast-speed dome 1) along the horizontal direction as shown in FIG. 5, θ is a rotation angle from the dot O of the half-sphere (i.e., the intelligent tracking fast-speed dome 1) along the vertical direction as shown in FIG. 5. A value of the φ and a value of the θ correspond to the P (horizontal rotation) value and the T (vertical rotation) value. That is, when the coordinate of the current tracking target in the spherical coordinate system taking the speed dome as the center is (u, v, w), $$P=\arctan(v/u) \quad (4)$$

$$T=\arctan(w/\sqrt{u^2+v^2}) \quad (5)$$

In step V, the Z value can be implemented according to method above (a process of obtaining Z can in accordance with procedures at block 2 and formula (1)).

According to the step II above, the magnification coefficient of the intelligent tracking fast-speed dome 1 is $Z_{ref}$ i.e., $Z_{ref}=Z_0 \times \sin(T_0)$. It is assumed that an angle of the camera lens of the speed dome and location information of the current tracking target is $T_1$, $$Z=Z_{ref}/\sin(T_1) \quad (6)$$

wherein $\sin(T_1)$ is an adjustment function of the dynamic magnification coefficient of the location information of the current tracking target. The $\sin(T_1)$ may be implemented as follows. When $T_1$ is large, a viewing area of the intelligent tracking fast-speed dome 1 is enlarged in order to avoid a shift of the tracking target characteristic point. When $T_1$ is small, the magnification value is increased in order to obtain the plentiful information of the tracking target.

Calculation of the P value, the T value and the Z value is performed in the ARM processor 111.

At block 5, according to the Z value, the magnification of the speed dome is adjusted in real time, according to the P value and the T value, the rotation of the speed dome is controlled in real time.

The adjustment module 17 adjusts the magnification of the speed dome in real time according to the Z value, controls the rotation of the speed dome according to the P value and the T value. In particular, the adjustment module 17 includes a zoom motor 13, a horizontal rotation motor 14 and a vertical rotation motor 15. The zoom motor 13 adjusts the magnification of the speed dome in real time according to the Z value. The horizontal rotation motor 14 controls the horizontal rotation of the speed dome according to the P value. The vertical rotation motor 15 controls the vertical rotation of the speed dome according to the T value. That is, the horizontal rotation motor 14 and the vertical rotation motor 15 control the rotation of the speed dome in real time.

After the Z value is obtained according to formula (6), the central processor 11, e.g., the ARM processor 111 outputs the Z value to the zoom motor 13 through the driven circuit 16 in order to implement automatic control of the magnification.

After the P value and the T value are obtained according to formulas (4) and (5), the ARM processor 111 respectively outputs the P value and T value to the horizontal rotation motor 14 and the vertical rotation motor 15 through the driven circuit 16 to implement automatic rotation control of the intelligent tracking fast-speed dome 1.

Figure 8:
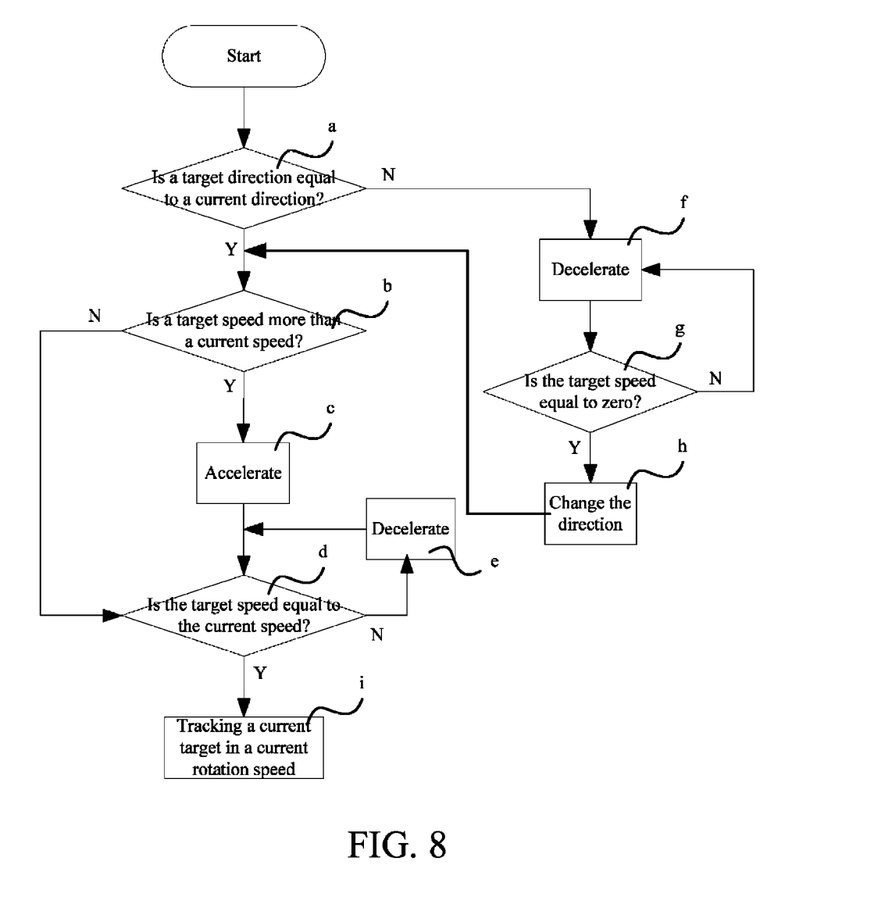
FIG. 8 is a flowchart illustrating a process of controlling a speed dome to perform smooth rotation according to an embodiment of the present invention.

In a practical control, the P value and T value are outputted to the horizontal rotation motor 14 and the vertical rotation motor 15, thus, a condition of the discontinuous image may occur. In order to obtain a smooth image when tracking is performed, a control method based on a target speed is used in the present invention. Difference is performed respectively between the obtained P value, the obtained T value and the current P value and the current T value of the horizontal rotation motor 14 and the vertical rotation motor 15 as follows. It is assumed that the new P value and the new T value of the current tracking target in the spherical coordinate system taking the intelligent tracking fast-speed dome 1 as the center are respectively $P_{new}$, $T_{new}$. The current P value and the current T value in the spherical coordinate system are respectively $P_{cur}$, $T_{cur}$. Time when a frame of the tracking image is processed is $\Delta t$. A value and a direction of a speed of the current tracking image are determined according to the following formula:

$$V_{pan} = \frac{\Delta P}{\Delta t} = \frac{P_{new} - P_{cur}}{\Delta t} \qquad (7)$$

$$V_{tilt} = \frac{\Delta T}{\Delta t} = \frac{T_{new} - T_{cur}}{\Delta t} \qquad (8)$$

wherein $V_{pan}$ is a moving speed of the current tracking target along a horizontal rotation direction in a spherical coordinate system taking the intelligent tracking fast-speed dome 1 as the center, $V_{tilt}$ is a moving speed of the current tracking target along a vertical rotation direction in a spherical coordinate system taking the intelligent tracking fast-speed dome 1 as the center. According to the value and the direction of the speed of the current tracking target, the intelligent tracking fast-speed dome 1 is controlled to perform accelerating rotation and decelerating rotation, so that the intelligent tracking fast-speed dome 1 can perform smooth rotation. The control process is illustrated in FIG. 8, which includes procedures as follows.

At block a, it is determined whether the moving direction of the current tracking target is same with the current rotation direction of the intelligent tracking fast-speed dome 1, when the moving direction of the current tracking target is same with the current rotation direction of the intelligent tracking fast-speed dome 1, procedures at block b are performed, otherwise procedures at block f are performed.

At block b, it is determined whether the moving speed of the current tracking target is more than the current rotation speed of the intelligent tracking fast-speed dome 1, when the moving speed of the current tracking target is more than the current rotation speed of the intelligent tracking fast-speed dome 1, procedures at block c are performed, otherwise, procedures at block d are performed.

At block c, the current rotation speed of the intelligent tracking fast-speed dome 1 is accelerated, and the procedures at block d are performed.

At block d, it is determined whether the moving speed of the current tracking target is equal to the current rotation speed of the intelligent tracking fast-speed dome 1, when the moving speed of the current tracking target is equal to the current rotation speed of the intelligent tracking fast-speed dome 1, procedures at block i are performed, otherwise, procedures at block e are performed.

At block e, the current rotation speed of the intelligent tracking fast-speed dome 1 is decelerated, and the procedures at block d are performed.

At block f, the current rotation speed of the intelligent tracking fast-speed dome 1 is decelerated, and procedures at block g are performed.

At block g, it is determined whether the current rotation speed of the intelligent tracking fast-speed dome 1 is equal to zero, when the current rotation speed of the intelligent tracking fast-speed dome 1 is equal to zero, procedures at block h are performed, otherwise, procedures at block f are performed.

At block h, the rotation direction of the intelligent tracking fast-speed dome 1 is changed, and the procedures at block b are performed.

At block i, the current tracking target is tracked according to the current rotation speed.

In a process of tracking a target according to procedures at the blocks above, the ARM processor 111 may wait for the host computer 2 to select a new target at any time. After the host computer 2 re-selects the new target, a new process of tracking a target is triggered according to the condition at block 1.

As shown in FIG. 1, a system for an intelligent tracking fast-speed dome provided according to an embodiment of the present invention includes an intelligent tracking fast-speed dome 1 and a host computer 2.

The host computer 2 is to transmit a location coordinate of a newly-selected target in a tracking image to the intelligent tracking fast-speed dome 1 in a process of tracking a target.

The intelligent tracking fast-speed dome 1 includes a central processor 11, an image collecting module 12, and an adjustment module 17. The central processor 11 is to match a location coordinate of a newly-selected target in a tracking image collected by the image collecting module 12 when receiving the location coordinate of the newly-selected target in the tracking image in a process of tracking a target, set a target corresponding to the location coordinate of the newly-selected target as a current target, extract a characteristic of the current target, track the current target according to the characteristic of the current target. The central processor 11 is to in real time update the location coordinate of the current target in the tracking image, in real time transform the updated location coordinate of the current target to a Pan (P) value, a Tilt (T) value and a Zoom (Z) value recognizable for a speed dome, output to the adjustment module 17 the P value, the T value and the Z value via a driven circuit 16.

The adjustment module 17 is to in real time adjust a magnification according to the Z value, in real time control rotation of the speed dome according to the P value and the T value.

The central processor may include an ARM processor 111, a DSP 112. The ARM processor 111 is to transmit to the DSP 112 the received location coordinate of the newly-selected target in the tracking image transmitted from the host computer 2, in real time transform the received updated location coordinate of the current target transmitted from the DSP 112 to the P value, the T value and the Z value recognizable for a speed dome, output to the adjustment module the P value, the T value and the Z value via the driven circuit. The DSP 112 is to match a location coordinate of a newly-selected target in a tracking image collected by the image collecting module 12 when receiving the location coordinate of the newly-selected target in the tracking image in a process of tracking a target, set a target corresponding to the location coordinate of the newly-selected target as a current target, extract a characteristic of the current target, track the current target according to the characteristic of the current target, in real time update the location coordinate of the current target in the tracking image, transmit the updated location coordinate of the current target to the ARM processor 111.

The central processor 11 is further to select a monitoring scenario, and calibrate a magnification coefficient of the speed dome. The central processor 11 is further to transform the location coordinate of the newly-selected target to a normalized coordinate, wherein the normalized coordinate a coordinate value after a normalization processing corresponding to a length and a width of the image is performed. The central processor 11 is further to transform the updated location coordinate of the current target to a spherical coordinate setting the speed dome as a center, obtain the P value and the T value of the spherical coordinate, obtain the Z value according to location information of the current target and the magnification coefficient of the speed dome.

The adjustment module 17 includes a zoom motor 13, a horizontal rotation motor 14 and a vertical rotation motor 15. The zoom motor 13 is to in real time adjust the magnification according to the Z value. The horizontal rotation motor 14 is to in real time control horizontal rotation of the speed dome according to the P value. The vertical rotation motor 15 is to in real time control vertical rotation of the speed dome according to the T value.

According to the target tracking method for an intelligent tracking fast-speed dome, the intelligent tracking fast-speed dome and the target tracking system for an intelligent tracking fast-speed dome provided according to embodiments of the present invention, when multiple targets occur in a scenario, a monitoring person can select a target concerned by the monitoring person to perform a selective tracking process and solve a problem that in the scenario that the multiple targets occur, the tracking target is not the concerned target, the concerned target is missed, and a monitoring purpose cannot be achieved. At the same time, in a tracking process of the speed dome, since the scenario is complicated and an image analysis technology is limited, a condition may occur that the target is missed or is blocked by another target. According to the method of the present invention, the target can be re-selected. In addition, in a scenario that a large target is tracked, e.g., a large truck, in a conventional method, a target for image analysis may be on a top of the truck or another part, and may not be in a concerned license plate location, which may cause that in the tracking process, the license plate cannot be seen. According to the method, the speed dome and the system for the speed dome of the present invention, the license plate part can be selected to be tracked.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A target tracking method for an intelligent tracking speed dome, comprising:
   matching a location coordinate of a newly-selected target in a collected tracking image when receiving the location coordinate of the newly-selected target in the tracking image in a process of tracking a target, setting a target corresponding to the location coordinate of the newly-selected target as a current target, extracting a characteristic of the current target;
   tracking the current target according to the characteristic of the current target, in real time updating the location coordinate of the current target in the tracking image;
   in real time transforming the updated location coordinate of the current target to a Pan (P) value, a Tilt (T) value and a Zoom (Z) value recognizable for a speed dome; and
   in real time adjusting a magnification according to the Z value, in real time controlling rotation of the speed dome according to the P value and the T value;
   wherein controlling the rotation of the speed dome according to the P value and the T value comprises:
   determining a value and a direction of a speed of the current target as follows;

$$V_{tilt} = \frac{\Delta T}{\Delta t} = \frac{T_{new} - T_{cur}}{\Delta t}$$
$$V_{pan} = \frac{\Delta P}{\Delta t} = \frac{P_{new} - P_{cur}}{\Delta t}$$

wherein $V_{pan}$ is a moving speed along a horizontal rotation direction in a spherical coordinate system taking the speed dome as the center, $V_{tilt}$ is a moving speed along a vertical rotation direction in the spherical coordinate system taking the speed dome as the center; $P_{new}$ and $T_{new}$ are respectively a new P value and a new T value in the spherical coordinate system taking the speed dome as the center, $P_{cur}$, $T_{cur}$ is a current P value and a current T value of the speed dome, $\Delta t$ is time of processing a frame;
   controlling the speed dome to be accelerated or decelerated according to the value and the direction of the speed of the current target;
   wherein controlling the speed dome to be accelerated or decelerated according to the value and the direction of the speed of the current target comprises:
   (a) determining whether a moving direction of the current tracking target is same as a current rotation direction of the speed dome, when the moving direction of the current tracking target is same as the current rotation direction of the speed dome, performing (b), otherwise, performing (f);
   (b) determining whether the moving speed of the current tracking target is more than a current rotation speed of the speed dome, when the moving speed of the current tracking target is more than the current rotation speed of the speed dome, performing (c), otherwise, performing (d);
   (c) accelerating the current rotation speed of the speed dome, and performing (d);
   (d) determining whether the moving speed of the current tracking target is equal to the current rotation speed of the speed dome, when the moving speed of the current tracking target is equal to the current rotation speed of the speed dome, performing (i), otherwise, performing (e);

(e) decelerating the current rotation speed of the speed dome, and performing (d);

(f) decelerating the current moving speed of the speed dome, and performing (g);

(g) determining whether the current rotation speed is equal to zero, when the current rotation speed is equal to zero, performing (h), otherwise performing (f);

(h) changing the rotation direction of the speed dome, and performing (b);

(i) tracking the current target with the current rotation speed.

2. The method of claim 1, further comprising:

selecting a monitoring scenario;

setting a ground level as a monitoring area; wherein the magnification coefficient of the speed dome is $Z_0 \times \sin(T_0)$;

wherein $Z_0$ is the Z value when a distance between a reference target and the speed dome is a known distance $D_0$;

$T_0$ is the T value when the distance between the reference target and the speed dome is the known distance $D_0$.

3. The method of claim 1, further comprising:

transforming the location coordinate of the newly-selected target to a normalized coordinate, wherein the normalized coordinate is a coordinate value after a normalization processing corresponding to a length and a width of the image is performed.

4. The method of claim 1, wherein in real time transforming the updated location coordinate of the current target to the P value, the T value and the Z value recognizable for a speed dome comprises:

transforming the updated location coordinate of the current target to a spherical coordinate taking the speed dome as a center;

obtaining the P value and the T value of the spherical coordinate; and obtaining the Z value according to location information of the current target and the magnification coefficient of the speed dome.

5. The method of claim 4, wherein the P value and the T value are obtained according to the spherical coordinate as follows:

$P = \arctan(v/u)$ $T = \arctan(w/\sqrt{u^2+v^2})$ wherein the spherical coordinate of the current target is (u, v, w), the spherical coordinate taking the speed dome as the center.

6. The method of claim 4, wherein the Z value is obtained according to location information of the current target and the magnification coefficient of the speed dome as follows:

$Z = Z_{ref}/\sin(T_1)$;

wherein $\sin(T_1)$ is an adjustment function of the dynamic magnification coefficient of the location information of the current target, $Z_{ref}$ is the magnification coefficient of the speed dome, $T_1$ is an angle of the location of the current target and a camera lens of the speed dome.

7. An intelligent tracking speed dome, comprising an image collecting module, a central processor, a driven circuit and an adjustment module, the central processor is to match a location coordinate of a newly-selected target in a tracking image collected by the image collecting module when receiving the location coordinate of the newly-selected target in the tracking image in a process of tracking a target, set a target corresponding to the location coordinate of the newly-selected target as a current target, extract a characteristic of the current target, track the current target according to the characteristic of the current target, in real time update the location coordinate of the current target in the tracking image, in real time transform the updated location coordinate of the current target to a Pan (P) value, a Tilt (T) value and a Zoom (Z) value recognizable for a speed dome, output to the adjustment module the P value, the T value and the Z value via the driven circuit; and the adjustment module is to in real time adjust a magnification according to the Z value, in real time control rotation of the speed dome according to the P value and the T value;

wherein controlling the rotation of the speed dome according to the P value and the T value comprises:

determining a value and a direction of a speed of the current target as follows;

$$V_{tilt} = \frac{\Delta T}{\Delta t} = \frac{T_{new} - T_{cur}}{\Delta t}$$

$$V_{pan} = \frac{\Delta P}{\Delta t} = \frac{P_{new} - P_{cur}}{\Delta t}$$

wherein $V_{pan}$ is a moving speed along a horizontal rotation direction in a spherical coordinate system taking the speed dome as the center, $V_{tilt}$ is a moving speed along a vertical rotation direction in the spherical coordinate system taking the speed dome as the center; $P_{new}$ and $T_{new}$ are respectively a new P value and a new T value in the spherical coordinate system taking the speed dome as the center, $P_{cur}$, $T_{cur}$ is a current P value and a current T value of the speed dome, $\Delta t$ is time of processing a frame;

controlling the speed dome to be accelerated or decelerated according to the value and the direction of the speed of the current target;

wherein controlling the speed dome to be accelerated or decelerated according to the value and the direction of the speed of the current target comprises:

(a) determining whether a moving direction of the current tracking target is same as a current rotation direction of the speed dome; when the moving direction of the current tracking target is same as the current rotation direction of the speed dome, performing (b), otherwise, performing (f);

(b) determining whether the moving speed of the current tracking target is more than a current rotation speed of the speed dome, when the moving speed of the current tracking target is more than the current rotation speed of the speed dome, performing (c), otherwise, performing (d);

(c) accelerating the current rotation speed of the speed dome, and performing (d);

(d) determining whether the moving speed of the current tracking target is equal to the current rotation speed of the speed dome, when the moving speed of the current tracking target is equal to the current rotation speed of the speed dome, performing (i), otherwise, performing (e);

(e) decelerating the current rotation speed of the speed dome, and performing (d);

(f) decelerating the current moving speed of the speed dome, and performing (g);

(g) determining whether the current rotation speed is equal to zero, when the current rotation speed is equal to zero, performing (h), otherwise performing (f);

(h) changing the rotation direction of the speed dome, and performing (b);

(i) tracking the current target with the current rotation speed.

8. The intelligent tracking speed dome of claim 7, wherein the central processor comprises a digital signal processor (DSP) and an Advanced RISC Machines (ARM) processor:

the ARM processor is to transmit to the DSP the received location coordinate of the newly-selected target in the tracking image from a host computer, in real time transform the received updated location coordinate of the current target transmitted from the DSP to the P value, the T value and the Z value recognizable for a speed dome, output to the adjustment module the P value, the T value and the Z value via the driven circuit;

the DSP is to match the location coordinate of the newly-selected target in the tracking image collected by the image collecting module when receiving the location coordinate of the newly-selected target in the tracking image in the process of tracking the target, set the target corresponding to the location coordinate of the newly-selected target as the current target, extract the characteristic of the current target, track the current target according to the characteristic of the current target, in real time update the location coordinate of the current target in the tracking image, transmit the updated location coordinate of the current target to the ARM processor.

9. The intelligent tracking speed dome of claim 7, wherein the central processor is further configured to:

select a monitoring scenario;

calibrate a magnification coefficient of the speed dome; and transform the location coordinate of the newly-selected target to a normalized coordinate, wherein the normalized coordinate is a coordinate value after a normalization processing corresponding to a length and a width of the image is performed.

10. The intelligent tracking fast-speed dome of claim 7, wherein the central processor is further configured to:

transform the updated location coordinate of the current target to a spherical coordinate taking the speed dome as a center;

obtain the P value and the T value of the spherical coordinate; and obtain the Z value according to location information of the current target and the magnification coefficient of the speed dome.

11. A system for an intelligent tracking fact speed dome, comprising an intelligent tracking speed dome and a host computer, the host computer, in a process of tracking a target, transmits a location coordinate of a newly-selected target in a tracking image to the intelligent tracking speed dome;

the intelligent tracking speed dome comprises an image collecting module, a central processor, and an adjustment module, wherein the central processor matches a location coordinate of a newly-selected target in a tracking image collected by the image collecting module when receiving the location coordinate of the newly-selected target in the tracking image in a process of tracking a target, sets a target corresponding to the location coordinate of the newly-selected target as a current target, extract a characteristic of the current target, tracks the current target according to the characteristic of the current target, in real time updates the location coordinate of the current target in the tracking image, in real time transforms the updated location coordinate of the current target to a Pan (P) value, a Tilt (T) value and a Zoom (Z) value recognizable for a speed dome, outputs to the adjustment module the P value, the T value and the Z value via a driven circuit; and the adjustment module in real time adjusts a magnification according to the Z value, in real time control rotation of the speed dome according to the P value and the T value;

wherein controlling the rotation of the speed dome according to the P value and the T value comprises:

determining a value and a direction of a speed of the current target as follows;

$$V_{tilt} = \frac{\Delta T}{\Delta t} = \frac{T_{new} - T_{cur}}{\Delta t}$$

$$V_{pan} = \frac{\Delta P}{\Delta t} = \frac{P_{new} - P_{cur}}{\Delta t}$$

wherein $V_{pan}$ is a moving speed along a horizontal rotation direction in a spherical coordinate system taking the speed dome as the center, $V_{tilt}$ is a moving speed along a vertical rotation direction in the spherical coordinate system taking the speed dome as the center; $P_{new}$ and $T_{new}$ are respectively a new P value and a new T value in the spherical coordinate system taking the speed dome as the center, $P_{cur}$, $T_{cur}$ is a current P value and a current T value of the speed dome, $\Delta t$ is time of processing a frame;

controlling the speed dome to be accelerated or decelerated according to the value and the direction of the speed of the current target;

wherein controlling the speed dome to be accelerated or decelerated according to the value and the direction of the speed of the current target comprises:

(a) determining whether a moving direction of the current tracking target is same as a current rotation direction of the speed dome; when the moving direction of the current tracking target is same as the current rotation direction of the speed dome, performing (b), otherwise, performing (f);

(b), determining whether the moving speed of the current tracking target is more than a current rotation speed of the speed dome, when the moving speed of the current tracking target is more than the current rotation speed of the speed dome, performing (c), otherwise, performing (d);

(c) accelerating the current rotation speed of the speed dome, and performing (d);

(d) determining whether the moving speed of the current tracking target is equal to the current rotation speed of the speed dome, when the moving speed of the current tracking target is equal to the current rotation speed of the speed dome, performing (i), otherwise, performing (e);

(e) decelerating the current rotation speed of the speed dome, and performing (d);

(f) decelerating the current moving speed of the speed dome, and performing (g);

(g) determining whether the current rotation speed is equal to zero, when the current rotation speed is equal to zero, performing (h), otherwise performing (f);

(h) changing the rotation direction of the speed dome, and performing (b);

(i) tracking the current target with the current rotation speed.

12. The system of claim 11, wherein the central processor comprises a digital signal processor (DSP) and an Advanced RISC Machines (ARM) processor:

the ARM processor is to transmit to the DSP the received location coordinate of the newly-selected target in the tracking image transmitted from the host computer, in real time transform the received updated location coordinate of the current target transmitted from the DSP to the P value, the T value and the Z value recognizable for a speed dome, output to the adjustment module the P value, the T value and the Z value via the driven circuit;

the DSP is to match the location coordinate of the newly-selected target in the tracking image collected by the image collecting module when receiving the location coordinate of the newly-selected target in the tracking image in the process of tracking the target, set the target corresponding to the location coordinate of the newly-selected target as the current target, extract the characteristic of the current target, track the current target according to the characteristic of the current target, in real time update the location coordinate of the current target in the tracking image, transmit the updated location coordinate of the current target to the ARM processor.

13. The system of claim 11, wherein the central processor is further configured to:

select a monitoring scenario;

calibrate a magnification coefficient of the speed dome;

transform the location coordinate of the newly-selected target to a normalized coordinate, wherein the normalized coordinate is a coordinate value after a normalization processing corresponding to a length and a width of the image is performed;

transform the updated location coordinate of the current target to a spherical coordinate taking the speed dome as a center;

obtain the P value and the T value of the spherical coordinate; and obtain the Z value according to location information of the current target and the magnification coefficient of the speed dome.

\* \* \* \* \*